No. 795,249. PATENTED JULY 18, 1905.
G. S. COX.
HAIRCLOTH LOOM.
APPLICATION FILED DEC. 31, 1903.

6 SHEETS—SHEET 1.

WITNESSES:
William B Marks
M. M. Hamilton

INVENTOR
George S. Cox
BY
Harding & Harding
ATTORNEYS

No. 795,249. PATENTED JULY 18, 1905.
G. S. COX.
HAIRCLOTH LOOM.
APPLICATION FILED DEC. 31, 1903.

6 SHEETS—SHEET 2.

WITNESSES:
William B. Marks
M. M. Hamilton

INVENTOR
George S. Cox
BY
Harding & Harding
ATTORNEYS

No. 795,249. PATENTED JULY 18, 1905.
G. S. COX.
HAIRCLOTH LOOM.
APPLICATION FILED DEC. 31, 1903.
6 SHEETS—SHEET 3.
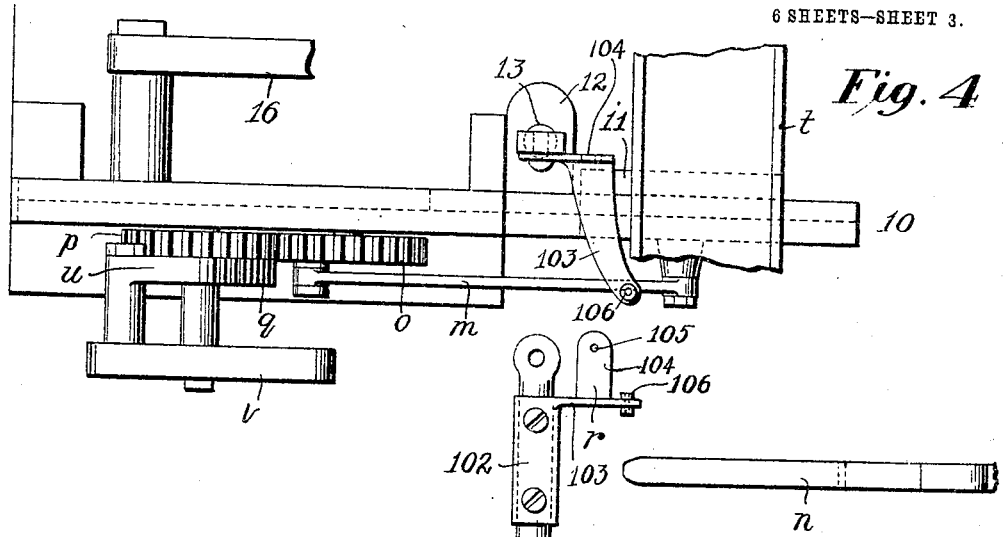
Fig. 4
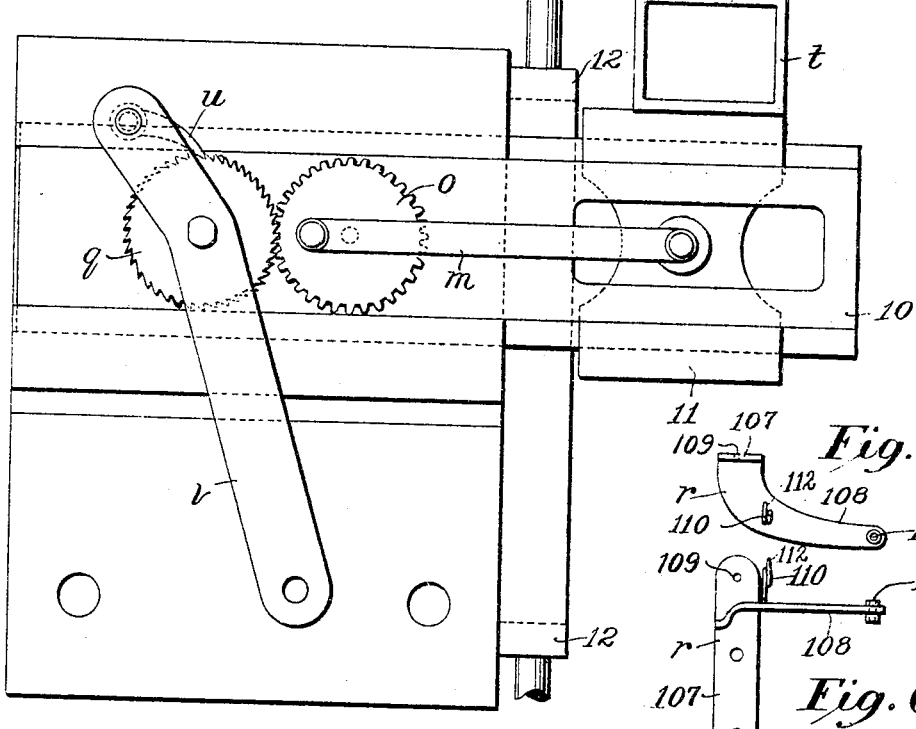
Fig. 3
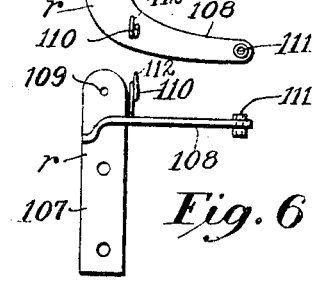
Fig. 5
Fig. 6
WITNESSES
William B. Marks.
M. M. Hamilton
INVENTOR
George S. Cox
BY
Harding & Harding
ATTORNEYS

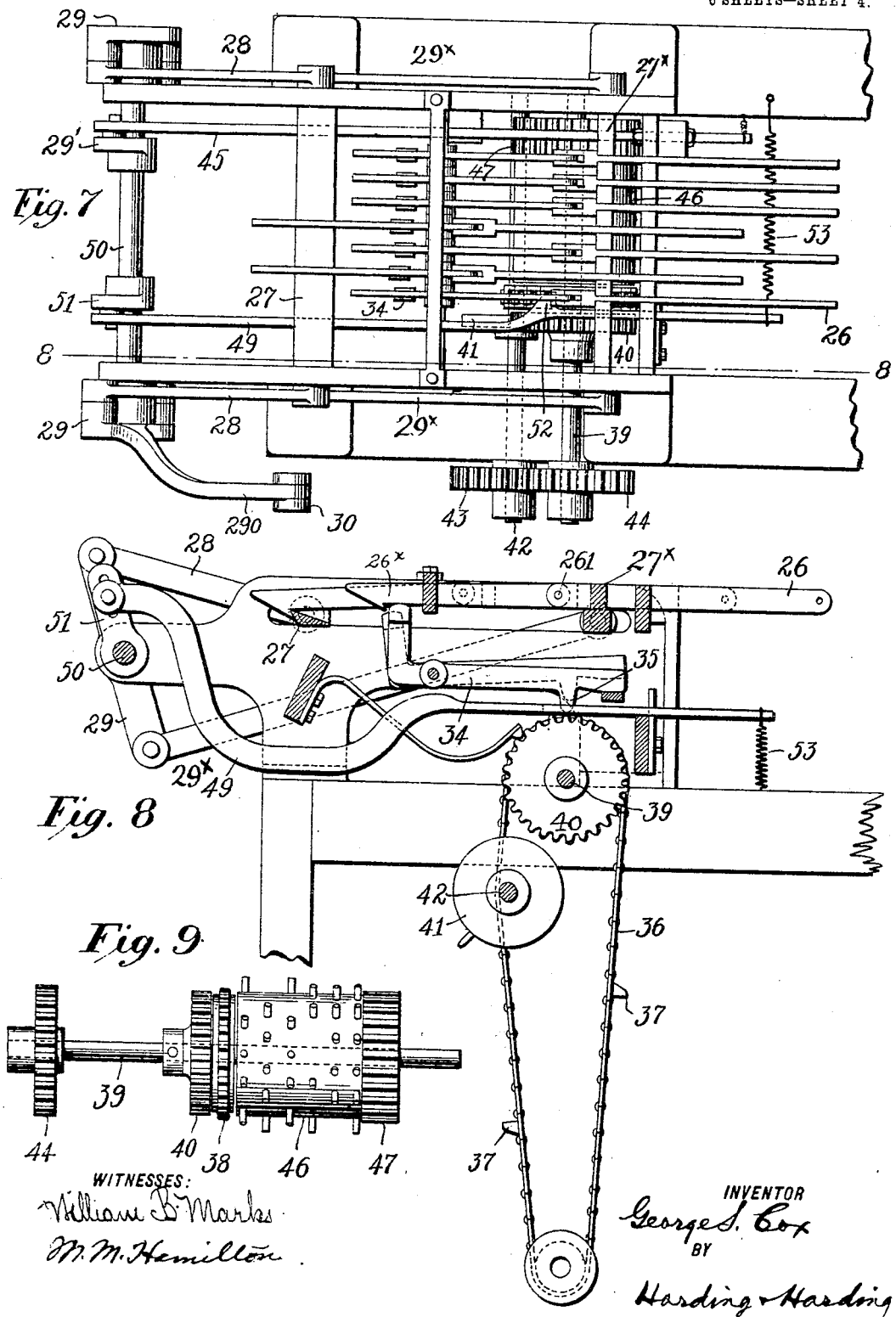

No. 795,249. PATENTED JULY 18, 1905.
G. S. COX.
HAIRCLOTH LOOM.
APPLICATION FILED DEC. 31, 1903.
6 SHEETS—SHEET 5.
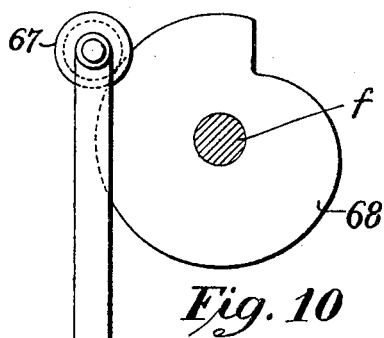
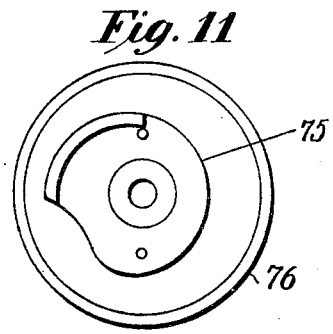
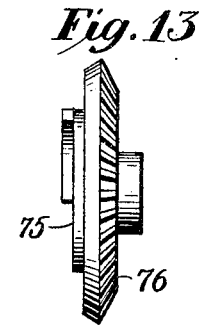
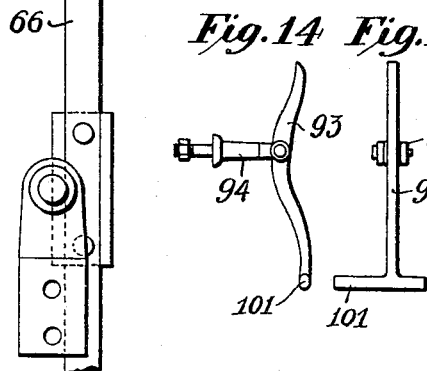
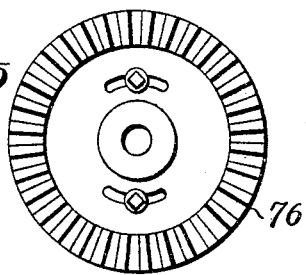
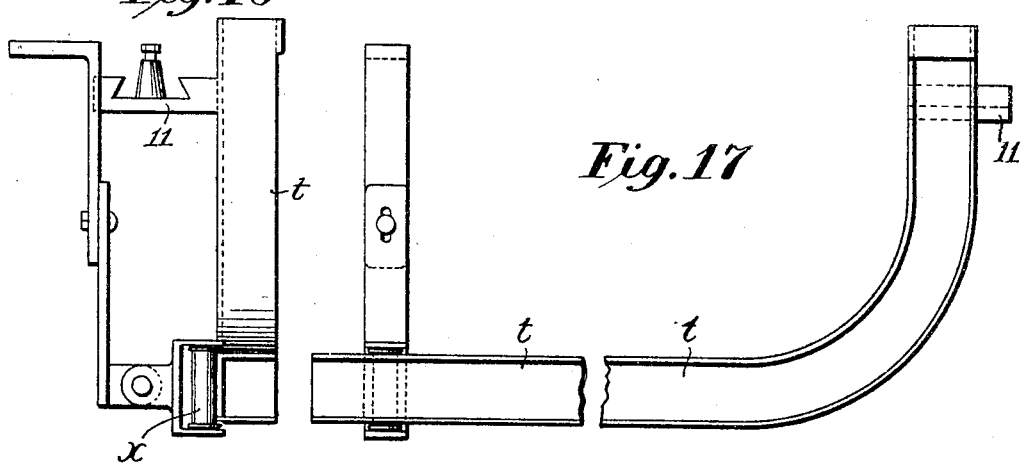
WITNESSES:
William B. Marks
M. M. Hamilton
INVENTOR
George S. Cox
BY
Harding & Harding
ATTORNEYS.

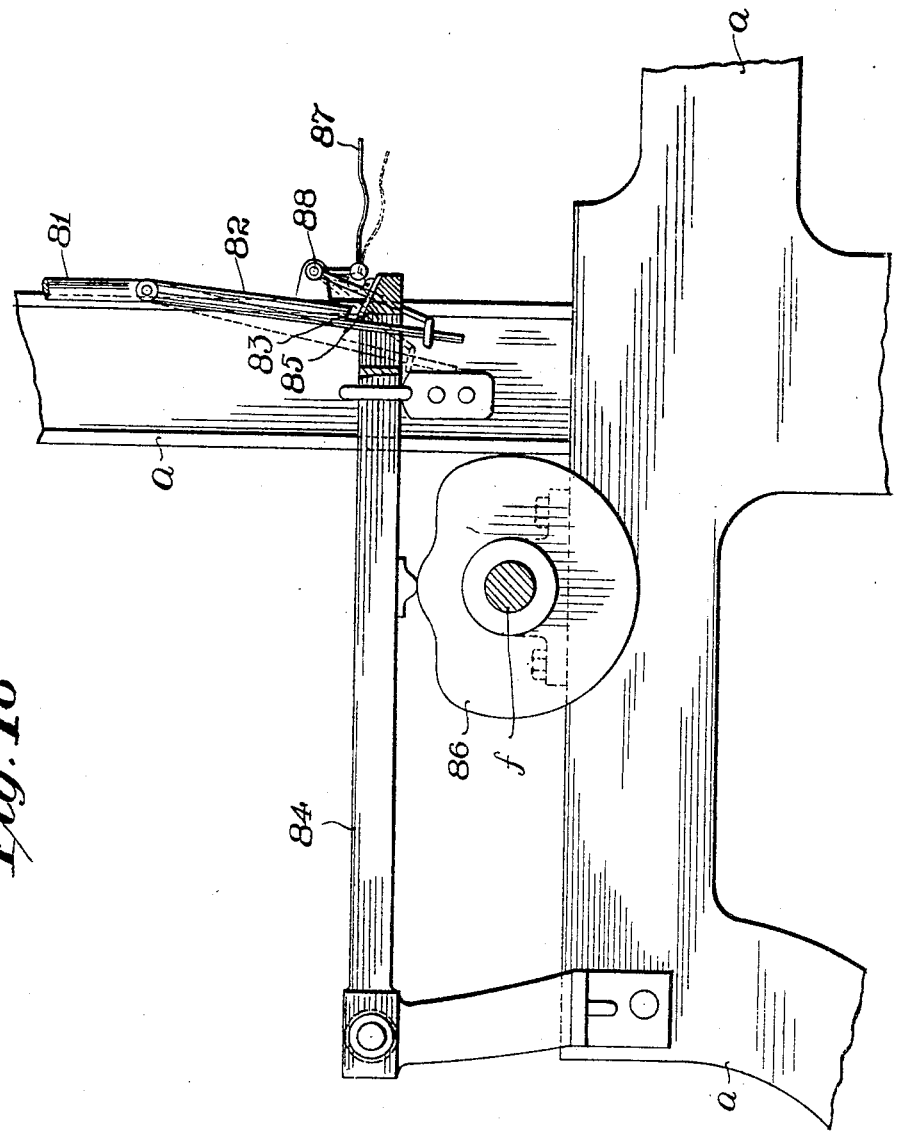

No. 795,249. Patented July 18, 1905.

UNITED STATES PATENT OFFICE.

GEORGE S. COX, OF FITZWATERTOWN, PENNSYLVANIA, ASSIGNOR TO HIMSELF, AND WALTER S. COX, OF PHILADELPHIA, PENNSYLVANIA, TRADING AS GEORGE S. COX AND BROTHER.

HAIRCLOTH-LOOM.

SPECIFICATION forming part of Letters Patent No. 795,249, dated July 18, 1905.

Application filed December 31, 1903. Serial No. 187,266.

*To all whom it may concern:*

Be it known that I, GEORGE S. COX, a citizen of the United States, residing at Fitzwatertown, county of Montgomery, and State of Pennsylvania, have invented a new and useful Improvement in Haircloth-Looms, of which the following is a full, clear, and exact description, reference being had to the accompanying drawings, which form a part of this specification.

My invention relates to looms, and more particularly to that type of loom adapted to the manufacture of haircloth.

The object of the invention is to produce a loom adapted to the manufacture of that variety of cloth shown, described, and claimed in Letters Patent to Walter S. Cox, No. 726,648, dated April 28, 1903, in which sections of linen or other flexible weft alternate with sections of horsehair or similar stiff material.

Another object of my invention is to produce a loom adapted to the manufacture of cloth in which a pick of hair and a pick of yarn are contained in each shed of warp, as shown, described, and claimed in Letters Patent issued to me September 13, 1904, No. 769,790.

The invention consists of means hereinafter described and claimed for weaving such varieties of cloth automatically.

Figure 1:
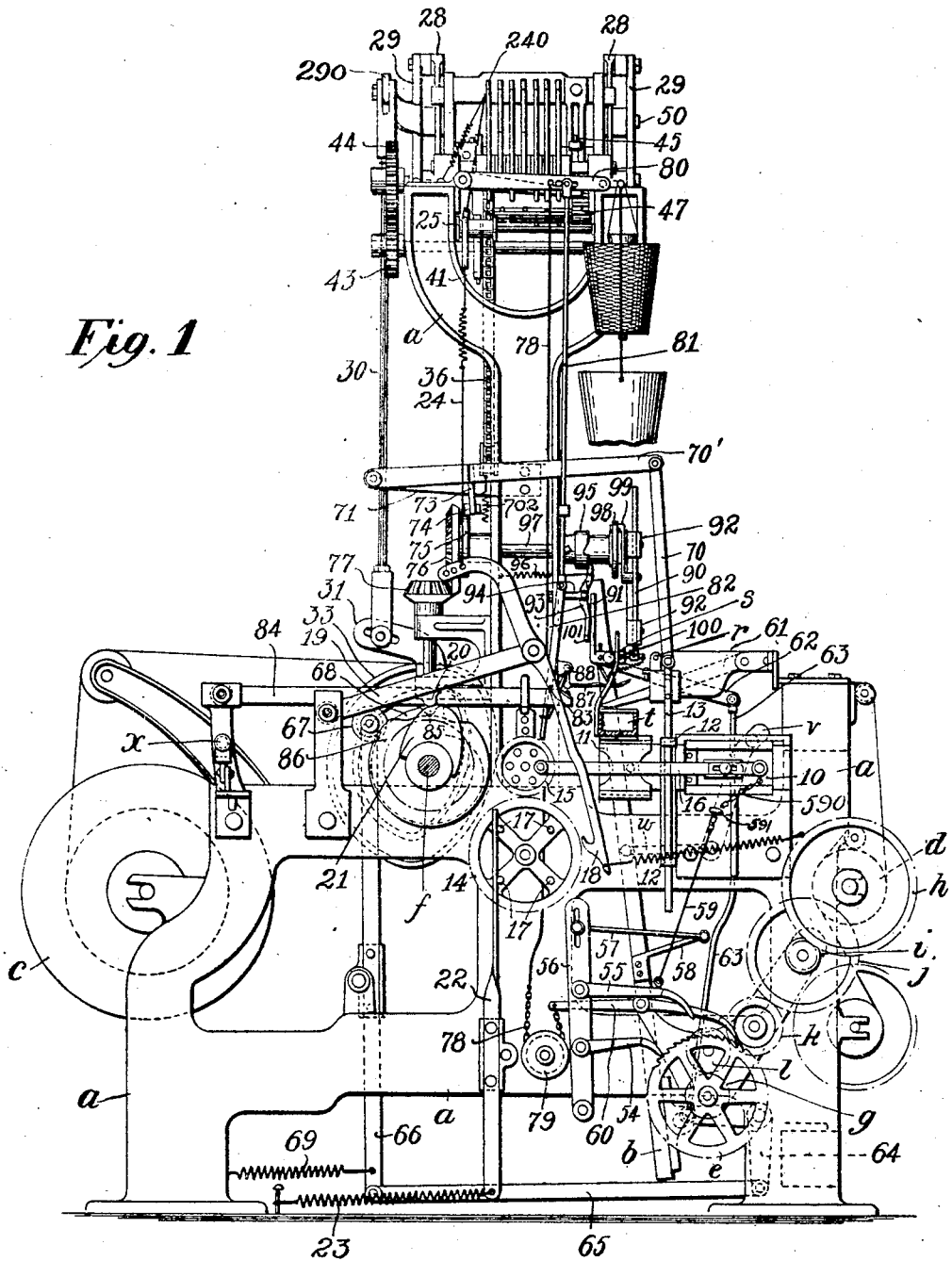
Figure 2:
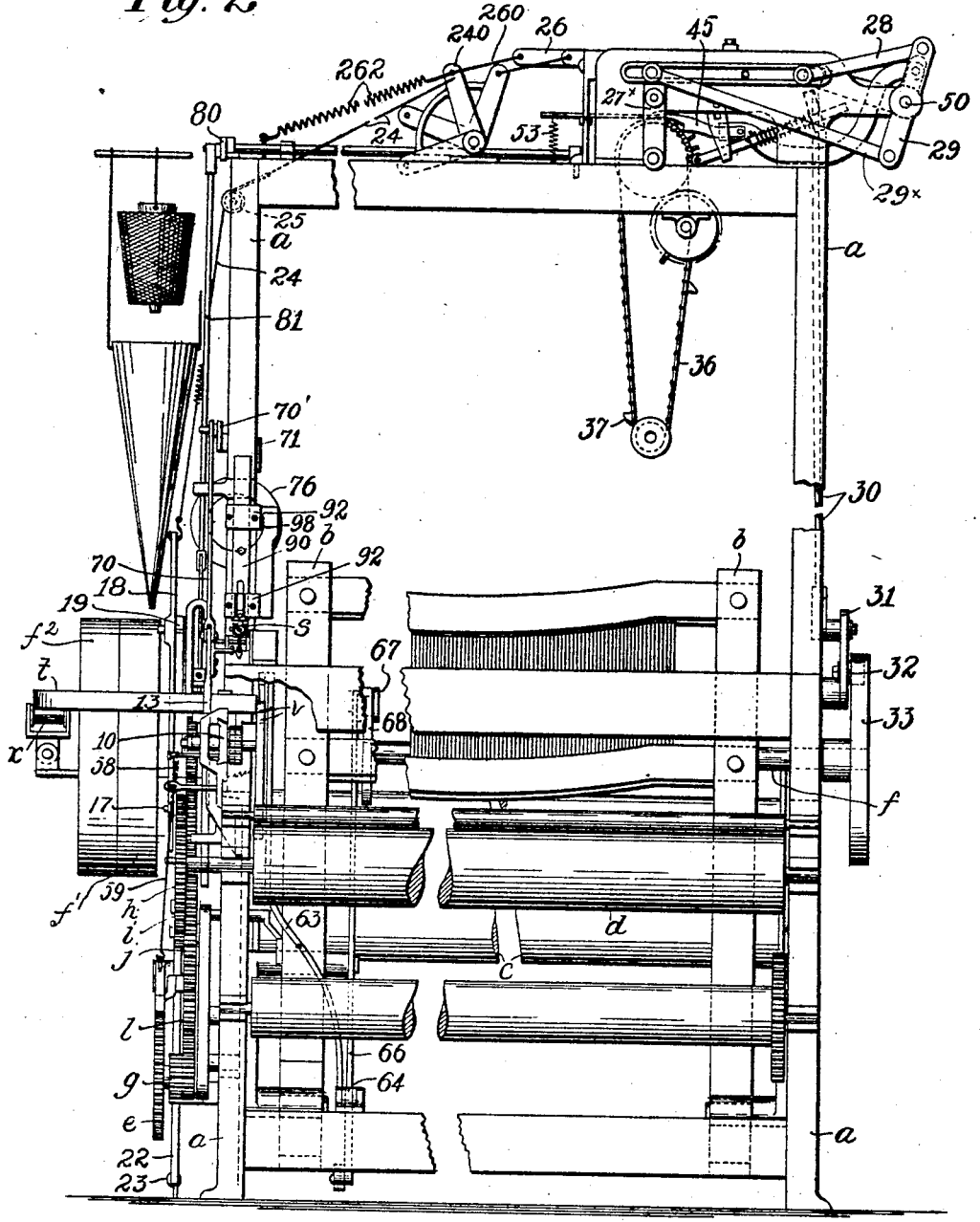

In the drawings, Figure 1 is a side elevation of the loom. Fig. 2 is a front elevation. Fig. 3 is a side elevation of the yarn-carrier and hair-trough-shifting mechanism looking at the same in the opposite direction from that in which it is viewed in Fig. 1. Fig. 4 is a plan view of Fig. 3. Fig. 5 is a detail view in plan, and Fig. 6 a detail view in elevation, of a modified construction of yarn-carrier. Fig. 7 is a plan view of the shedding-motion and other devices actuated by the pattern mechanism. Fig. 8 is a section on line 8 8 of Fig. 7. Fig. 9 is a detail view, in side elevation, of the pattern-drum, its shaft, and the gears and wheels carried thereby. Fig. 10 is a detail elevation of the shear-actuating cam and lever. Figs. 11, 12, and 13 are front, rear, and end views, respectively, of the gear and cam for actuating the yarn-carrier vertically. Figs. 14 and 15 are side and front views, respectively, of the device for actuating the movable jaw of the selector. Figs. 16 and 17 are end and plan views, respectively, of the hair-trough and its support. Fig. 18 is a detail view, in side elevation, of the mechanism for stopping the rotation of the take-up roller when the selector misses a hair.

$a$ is the frame of the loom, having suitable bearings for the studs of the lay $b$, for the spindles of the warp-beam $c$ and take-up roller $d$, for the shaft of ratchet-wheel $e$, and for the crank-shaft $f$.

$g$ is a spur-gear on the shaft of ratchet-wheel $e$.

$h$ is a spur-gear on the spindle of the take-up roller $d$.

$i\ j\ k\ l$ are the chain of gears connecting gears $g$ and $h$, whereby the take-up roller is operated.

$f'\ f^2$ are the tight and loose pulleys, respectively, on the crank-shaft.

To avoid confusion in the drawings, the usual well-known mechanism for operating the lay is not shown.

$t$ is the usual trough or receptacle containing the separate strands of horsehair.

$r$ is the yarn-carrier for the linen, cotton, or other yarn which it is designed to alternate with the hair, as before described, to form the weft of the compound cloth.

$n$ is the usual nipper, the well-known action of which is to grasp one end of a strand of hair that has been previously selected from the trough by the selector $s$ and throw or pull it across the loom. This nipper acts in my machine to pull either a pick of hair or a pin of yarn across the loom, dependent upon which of the two is in position to be grasped by the nipper at the beginning of its throw. I will therefore first describe the mechanism whereby the yarn and the hair are alternately brought into position to be grasped by the nipper.

10 is a slide working in a bracket supported on the loom-frame. This slide carries the slide 11, to which the hair-trough $t$ is secured, and the guide 12, through which extends the rod 13, to which is attached the thread-carrier r.

In the drawings Figs. 1 and 3 the parts are in the position that they occupy during the weaving of the hair-weft section of the fabric—that is, the trough t is directly under the selector, (the specific construction of which will be hereinafter described)—so that at each reciprocation of the selector a pick of hair will be selected from the trough and presented to the nipper at the beginning of its throw. The trough is given the usual reciprocating motion by the following means: The slide 11, to which the hair-trough is secured, is connected by a connecting-rod m with the gear o, driven by the gear p, the shafts of both gears turning in bearings in the slide 10. Fast to the shaft of gear p is a ratchet-wheel q, which is turned by a pawl u, pivoted on the upper end of a lever v. The lever v is pivoted between its ends on the shaft of gear p, the lower end of lever v being connected by a link w with the lay b. The lay thus imparts to the lever v a constantly-reciprocating motion, thus causing the pawl u to turn the ratchet q tooth by tooth. This movement of the ratchet-wheel imparts, through gears p and o and connecting-rod m, an alternate step-by-step advancing motion and step-by-step receding motion to slide 11 and trough t, thus bringing all sections of the trough immediately under the selector. The trough t is of the usual curved form, its rear end resting upon the roller x, which permits it to freely slide back and forth. During the described operation of the selector s the feed end of the yarn-carrier is located a short distance in front of the selector and the yarn carried by it is not, therefore, in position to be grasped by the nipper n. When, however, the slide 10 is moved back, (to the left, Fig. 1; to the right, Fig. 3,) a distance equal to that separating the selector and the feed end of the yarn-carrier, the latter is brought alongside the selector into such position that the free end of the yarn carried by it will be grasped by the nipper. At the same time the trough t is moved from under the selector, rendering the latter inoperative.

The following means are provided to actuate the slide 10: 14 and 15 are gears rotating in bearings in the loom-frame. The gear 15 carries a crank-pin which is connected by a rod 16 with the slide 10 and engages the gear 14, which I call the "index-wheel" and which is of twice the diameter of the gear 15. When the index-gear 14 is given a quarter-turn, the gear 15 is given a half-turn, drawing the slide 10 from the position shown in the drawings to its other operative position, at which the thread-carrier is in position to cause the yarn carried by it to be grasped by the nipper, as before described. When the index-gear 14 is given another quarter-turn, thereby giving the gear 15 another half-turn, the slide is returned to its illustrated position. To give the index-gear 14 a quarter-turn, I provide said gear with four pins 17, arranged ninety degrees apart, said pins being adapted to be engaged in turn by the hooked end of a lever 18, pivoted between its ends to one end of a lever 19. The other end of lever 19 is pivoted to the loom, and between its end is provided with a boss 20. On the cam-shaft is a crank 21, which at each rotation of the crank-shaft engages the boss 20, thus lifting the levers 19 and 18. It is difficult with this contrivance to turn the index-gear 14 precisely a quarter-turn, no more and no less. To insure accuracy in this respect, I provide a lever 22, pivoted between its ends, and by means of a tension-spring 23, secured to its lower end, caused to press against two of the pins on the index-gear. The lever 22 yields against the tension of spring 23 when the index-gear is turned by the hooked lever, and whether the gear is turned somewhat more or somewhat less than a quarter-turn the lever under the action of the spring brings the gear to the desired position. Normally the lever 18 reciprocates idly, the hooked end of the lever not being in position to engage a pin. The lever is turned on its pivot to bring it into operative position only when it is desired to actuate the slide to and change the weft. The lever is so turned on its pivot by lifting the flexible connection 24, which is attached to the upper end of the hooked lever. The other end of the flexible connection 24 extends over the roller 25 and is secured to one end of a bell-crank 240, the same end of the bell-crank being connected by a rod 260 with one end of the draw-bar 26. The draw-bar 26 is made in two sections hinged together at 261. The other end $26^\times$ of the draw-bar 26 is notched and adapted to be engaged by the constantly-reciprocating knife 27 of the shedding-motion. The knife 27 is attached to the ends of connecting-rods 28, which are pivoted to double-ended levers 29, secured to the shaft 50. The lower arms of levers 29 are connected by links $29^\times$ with the cross-bar $27^\times$, which is adapted at each oscillation of the shaft 50 (as in the ordinary closed-shed machine) to pull the draw-bar 26 into position to be engaged by the knife 27 when the notched end $26^\times$ of the draw-bar 26 is dropped, as hereinafter described. 30 is a rod connected at one end to an arm 290 on one of the double-ended levers 29 and at the other end to one end of a lever 31, provided with a roller 32, engaging the camway of the cam-disk 33 on the cam-shaft, whereby the shaft 50 is oscillated. Normally, however, the knife 27 is ineffective to actuate the draw-bar 26, the notched end $26^\times$ of the draw-bar being held above the path of travel of the knife 27 by means of one end of a pivoted lever 34, the other end of lever 34 having a boss 35, which rests on the pattern-chain 36. When one of the lugs 37 of the pattern-chain travels under the boss 35 and lifts it and the corresponding end of the lever 34, the hooked end $26^\times$ of the draw-bar 26 drops. Then, as before described, the knife 27 actuates the draw-bar 26, which through the medium of the connections 24 and 260 moves the constantly-reciprocating hooked lever 18 into position to turn the gears 14 and 15 and shift the slide 10. As the knife 27 recedes the spring 262 (secured at one end to the frame $a$ and at the other end to one arm of the bell-crank 240) returns the bell-crank 240 and draw-bar 26 to their normal positions.

The following mechanism is provided to actuate the pattern-chain: 38 is a sprocket-wheel loose on the shaft 39 and around which the pattern-chain extends. Also loose on the shaft 39 and secured to the sprocket-wheel 38 is a toothed wheel 40. 41 is a disk secured to the shaft 42, said disk having a single tooth, which at each rotation of the disk engages the toothed wheel 40 and moves it and the sprocket-wheel a distance of one tooth. The shaft 42 has secured to it a gear 43, meshing with a gear 44, secured to the pattern-drum shaft 39. The pattern-drum shaft besides carrying the pattern-drum 46 has secured to it a ratchet-wheel 47, which is actuated by a pawl-lever 45, pivoted to an arm 29', secured to shaft 50. At each oscillation of the shaft 50, therefore, the pawl-lever 48 actuates the ratchet-wheel 47, which through shaft 45, gear 44, gear 43, and shaft 42 turns the toothed disk 41, and the disk 41 after the number of turns required to completely rotate it actuates the toothed wheel 40, sprocket-wheel 38, and pattern-chain 36. Inasmuch as the pattern-chain is moved but once in a number of reciprocations of the knife 27, the lug on the pattern-chain would continue to hold up the lever 34, and the draw-bar 26 would be reciprocated and the slide 10 moved at each oscillation of the shaft 50. Means are therefore provided to move the pattern-chain lug from under the lever 34 immediately after the draw-bar 26 is actuated. This is accomplished by means of a bar 49, pivoted to a crank 51 on the oscillating shaft 50, whereby the bar 49 is constantly reciprocated. The bar 49 is provided with the projection 52, which strikes the lug and moves it from under the lever 34, permitting lever 34 to drop and lift the draw-bar 26 out of the path of travel of the knife 27. To prevent the projection 52 of the bar 49 from moving the pattern-chain lug until the latter reaches the exact position necessary for it to assume to lift the lever 34, I make the rear face of the projection 52 inclined, so that when it strikes the lug the latter will force the bar 49 out just as it completes its stroke against the tension of the spring 53, to which the free end of bar 49 is secured. This operation is repeated until the lug is shifted to its operative position to lift the lever 34 and permit the draw-bar 26 to drop. As the knife 27 and bar 49 move from right to left, Fig. 7, the draw-bar 26 is shifted, and the lever 49 moves sufficiently far to cause the projection 52 to override the lug, whereupon the spring 53 draws the bar 49 into its normal position, causing the projection 52 to drop back of the lug and, as before described, move it out of operative position during the travel of the bar 49 from left to right.

I have now fully described the mechanism for actuating the slide 10, and thereby causing the fabric to be woven with alternate sections of hair and yarn. I will now describe the mechanism for actuating the ratchet $e$, which, as before described, actuates the take-up roller.

58 is a bracket secured to the lay.

56 is a lever pivoted at its lower end to the frame of the loom and connected at its upper end by a rod 57 with the bracket 58.

54 is a pawl pivoted to the lever 56. During the weaving of the haircloth-section of the fabric the pawl 54 is the operative pawl for the ratchet $e$, turning the latter at each forward stroke of the lay a distance of one tooth. During the weaving of the yarn-section it is ordinarily necessary to advance the cloth more rapidly because of the greater thickness of the yarn. To this end a second pawl 55 is pivoted to the lever 56, its point of attachment to lever 56 being about twice as far from the lever's pivot as the point of attachment of pawl 54, so that as the lay advances the pawl 55 when in operative position advances the ratchet a distance of two teeth. During the weaving of the hair-section the pawl 55 is held out of operation by means of a flexible connection composed of a chain 590 and cord 59, the latter being attached to pawl 55 and the former to slide 10. The said flexible connection passes through an eye 591, fixed to the loom-frame. When the slide is moved into position to bring the yarn-carrier into operation, the pawl 55 is permitted to drop, thus bringing it into operative position. During the operation of either pawl 54 or pawl 55 the pawl 60, pivoted to the frame, acts as a holding-pawl.

During the weaving of the yarn-section of the cloth it is necessary to cut off the yarn at or about the time that (preferably just before) the completion of the throw of a pick by the nipper $n$. To effect this, I provide a cutter or shears one blade 61 of which is secured to the loom-frame, while the other blade 62 is pivoted to blade 61 and connected, by means of a link 63, with one end of a bell-crank lever 64. The other end of the bell-crank is connected by a link 65 with the lower end of an intermediately-pivoted lever 66, the upper end of which carries a roller 67.

68 is a cam on the crank-shaft having an abrupt descent from its highest to its lowest point, so that as the roller 67 overrides its highest point the spring 69, acting upon the lower end of the lever 66, is free to draw that end of the lever 66 back rapidly, thus, through link 65, bell-crank 64, and link 63, drawing down the cutting end of blade 62 of the shears and severing the yarn. Immediately thereafter the cam 68 again acts upon the roller 67 to move the lever 66 to its illustrated position, thus again opening the blades of the shears.

It sometimes happens that the selector s misses a hair, under which conditions it is desirable to stop the rotation of the take-up roller in order to prevent the warp feeding forward until after a pick of hair is thrown. This is effected by lifting the holding-pawl 60 off the ratchet e, as without this pawl the tension of the take-up roller tends to return the ratchet-wheel after it is moved forward by the pawl 54. To raise pawl 60, the following mechanism is provided: Attached to the rear end of pawl 60 is a flexible connection 78, which extends around a roller 79 and thence up to the top of the loom, where it is attached to a pivoted lever 80. Pivoted to lever 80, near the point of attachment of the flexible connection 78, is a rod 81, to the lower end of which is pivoted a lever 82, having near its lower end a notch 83. Pivoted to the loom-frame is a lever 84, having a boss engaging a cam 86 on the crank-shaft. As the cam 86 rotates the lever 84 is raised and a lug 85 on the free end of the lever is adapted to engage the notch 83 of lever 82, thereby raising lever 82, rod 81, and lever 80, the latter, through the flexible connection 78, raising the pawl 60 out of contact with the ratchet-wheel e. Normally, however, the notched lever 82, just before the lever 84 rises, has been moved into the position shown in the drawings and is not in position to be engaged by the lug 85—that is, whenever the selector s selects a hair the hair as it is pulled across the loom by the nipper n engages and depresses the finger 87, secured to one arm of the bell-crank 88. The other arm of the bell-crank 88 has a bifurcated end engaging the lower end of the notched lever 82, and when the finger 87 is depressed the bell-crank moves the notched lever 82 into the position shown in dotted lines in Fig. 18 and out of the line of movement of the lug 85; but when the selector misses a hair there is nothing to move the notched lever 82 out of its vertical position, as shown in full lines in Fig. 18, which causes it to be engaged by the lever 84, with the result that the pawl 60 is lifted from the ratchet and remains disengaged until the selector succeeds in picking up a hair.

For purposes to be hereinafter described I impart to the yarn-carrier r a peculiar up- and-down movement. This I accomplish by the following means: Pivoted to the top of rod 13 is one end of a connecting-rod 70, the other end of which is connected to a lever 70', which is pivoted to a bracket 71. 73 is a bracket secured to lever 70' and having a roller 74, which contacts with a cam 75, secured to the gear 76, which is the usual gear for operating the selector s, as will be hereinafter described. The gear 76 is driven by gear 77, which is driven by means of connections from the crank-shaft, not herein shown, but well understood by those familiar with hair-cloth looms. As the cam 75 rotates it actuates the levers 70 and 70' and the rod 13 and yarn-carrier r. The shape of the cam is such that it moves the yarn-carrier down just after the nipper starts to pull the yarn across the loom and holds it down until after the shears have severed the yarn, immediately thereafter imparting to the yarn-carrier a quick up-and-down motion, and then, during the return travel of the nipper, moving the yarn-carrier up to its initial position. The spring 702, secured to lever 70', accelerates these downward movements. The purpose of the initial down movement of the yarn-carrier is to cause the yarn as it is being pulled through the shed to engage and depress the finger 87, and thus, as before described, move the notched lever 82 into its inoperative position to prevent it from being moved up to disengage the holding-pawl 60. When, however, the nipper misses the yarn, this downward movement of the yarn-carrier is ineffective and the finger 87 remains up, thereby causing the notched lever 82 to remain in its operative position, so that when it is engaged and moved up by the lever 84 it raises the pawl 60 out of contact with the ratchet-wheel, as before described. The final sudden up-and-down movement of the yarn-carrier is for the purpose of preventing the free end of the yarn from entangling with the the selector or from overlying the finger 87 (either of which conditions would otherwise tend to occur) and insure its being thrown into the approximately vertical position necessary to enable the nipper to grasp it.

The selector s is of a well-known construction. It consists of the part 90, vertically movable in guides 92 and carrying the fixed jaw, and the part 91, hinged to the part 90 and carrying the movable jaw.

97 is a shaft to which are secured the cam 95 and the crank-disk 98.

99 is a connecting-rod between the crank-disk 98 and the part 90, whereby the selector is reciprocated vertically.

93 is a lever pivoted between its ends to the bracket 94, one end of the lever engaging the part 91 and the other end the cam 95. When the upper end of lever 93 is brought opposite the low point of the cam 95, the spring 96 at once moves the lever 93 so as to engage the part 91 of the selector and move it on its hinge to open the jaws. As the upper end of lever 93 rides up onto the high point of the cam 95 the lever 93 is retracted from the part 91 of the selector, permitting it to drop to close the jaws.

It is desirable while the yarn-section of the cloth is being woven that the selector should be held out of action so far as concerns the opening and closing of the jaws thereof. To effect this, I provide an arm 100, extending upwardly from the trough $t$ and which when slide 10 is moved to the left engages an arm 101, secured to lever 93, moves said lever into its retracted position, and holds it there, thereby maintaining the jaws of the selector closed during the weaving of the yarn-section of the cloth.

The yarn-carrier $r$ (shown in Figs. 3 and 4) is the carrier that I use in the weaving of the compound cloth, consisting of alternate sections of hair and yarn weft and consists of the plate 102, the bracket 103, provided with the out-feed eye 106 and having the upturned portion 104, provided with the in-feed eye 105, the yarn extending from a source of supply first through eye 105 and then through eye 106.

If it is desired to weave a fabric consisting of a pick of yarn and a pick of hair in each shed of warp, I first bring the slide 10 to the position shown in the drawings. I then render inoperative the mechanism for shifting the slide 10, which may be done in a number of ways—such, for instance, as the removal of the hooked lever 18 and its actuating-lever 19. I then substitute for the yarn-carrier $r$ (shown in Figs. 3 and 4) the carrier shown in Figs. 5 and 6, wherein the bracket 108, secured to plate 107, extends a sufficient distance forward to cause the out-feed eye 111 thereof to extend opposite the jaws of the selector. The thread extends through eyes 109, 110, and 111 and thence down into position to be grasped by the nipper at the same time that the latter grasps the strand of hair picked by the selector. In this modified yarn-carrier the eye 111 corresponds to the eye 106 of the yarn-carrier (shown in Figs. 3 and 4) and eye 109 corresponds to the eye 105, the intermediate eye 110, formed by the twisted wire 112, being provided to guide the thread from the eye 109 to eye 111.

Having now fully described my invention, what I claim, and desire to protect by Letters Patent, is—

1. In a loom, in combination, a source of hair-supply, a source of yarn-supply, and mechanism adapted to insert a plurality of picks of hair and a plurality of picks of yarn alternately across the loom, substantially as described.

2. In a loom, in combination, a receptacle for hair, a selector, means to render the selector inoperative, a source of yarn-supply and mechanism adapted to insert picks of yarn while the selector is inoperative, substantially as described.

3. In a loom, in combination, a receptacle for hair, a selector, a yarn-carrier, a device adapted to grasp either the hair selected by the selector or the yarn carried by the yarn-carrier and insert a pick of such hair or yarn across the loom, and means to bring said device and said selector and said device and said yarn-carrier alternately into operative relation, substantially as described.

4. In a loom, in combination, a hair-trough, a vertically-reciprocating selector, and means to bring said trough and selector alternately into and out of operative relation with each other, substantially as described.

5. In a loom, in combination, a slide, a second slide mounted on the first slide, a hair-trough mounted on the second slide, a selector, means to move the second slide back and forth step by step along the first slide, and means to move the first slide alternately back and forth a distance sufficient to carry said trough into and out of operative relation with the selector, substantially as described.

6. In a loom, in combination, a selector, a hair-trough, a yarn-carrier and a nipper, and means to simultaneously throw said yarn-carrier and said nipper into operative relation and said selector and trough out of operative relation, and vice versa, substantially as described.

7. In a loom, in combination, a vertically-reciprocating selector, a slide, a hair-trough and a yarn-carrier carried by said slide, a nipper, and means to move said slide, thereby moving the yarn-carrier into and out of operative relation with the nipper and the trough into and out of operative relation with the selector, substantially as described.

8. In a loom, in combination, a slide, a hair-trough carried thereby, a gear-wheel, a crank connection between said gear-wheel and slide, an index-wheel adapted to drive said gear-wheel, and means to turn said index-wheel, substantially as described.

9. In a loom, in combination, an index-wheel having pins, a reciprocating hooked lever adapted to engage said pins and thereby impart partial turns to said index-wheel, and mechanism actuated by said index-wheel adapted to dictate the insertion of picks of hair and yarn alternately across the loom, substantially as described.

10. In a loom, in combination, an index-wheel having pins, a reciprocating hooked lever adapted to engage said pins and thereby impart partial turns to such index-wheel, mechanism actuated by said index-wheel adapted to dictate the insertion, alternately across the loom, of picks of hair and yarn, and a spring-pressed lever adapted to simultaneously engage two of said pins and thereby definitely determine the extent of movement of said wheel when so actuated by the hooked lever, substantially as described.

11. In a loom, in combination, a draw-bar, a reciprocating knife adapted to engage and move the draw-bar, mechanism adapted to dictate the insertion, alternately across the loom, of picks of hair and yarn, means actuated by the movement of the draw-bar to throw said mechanism into operation, and pattern mechanism adapted to cause said draw-bar to move into and out of line of travel of said knife, substantially as described.

12. In a loom, in combination, an index-wheel having pins, a reciprocating hooked lever adapted to engage said pins and thereby impart partial turns to said index-wheel, mechanism actuated by said index-wheel adapted to dictate the insertion of picks of hair and yarn alternately across the loom, pattern mechanism, and means controlled thereby to move said hooked lever into and out of operative position, substantially as described.

13. In a loom, in combination, weft-control mechanism adapted in operation to dictate the insertion of picks of hair and yarn alternately across the loom, pattern mechanism, and means controlled by the pattern mechanism to operate said weft-control mechanism, substantially as described.

14. In a loom, in combination, an index-wheel having pins, a slide operated by said index-wheel, a reciprocating hooked lever adapted to engage said pins and thereby impart partial turns to said index-wheel, a draw-bar, a reciprocating knife adapted to engage and move the draw-bar, pattern mechanism adapted to cause said draw-bar to move into and out of line of travel of said knife, and connections between the draw-bar and the hooked lever whereby the former moves the latter into operative position, substantially as described.

15. In a loom, in combination, mechanism adapted to dictate the insertion of picks of hair and yarn alternately across the loom, the take-up roller, and devices controlled by said mechanism for moving said take-up roller at different rates of speed during the insertion of hair and yarn weft respectively, substantially as described.

16. In a loom, in combination, weft-control mechanism adapted to dictate the insertion of picks of hair and yarn alternately across the loom, the take-up roller, a device for accelerating the speed of rotation of said take-up roller, and means actuated by the weft-control mechanism adapted to move said take-up-roller speed-accelerating device into and out of operative position, substantially as described.

17. In a loom, in combination, a vertically-reciprocating selector, a slide, a hair-trough and a yarn-carrier carried by said slide, a nipper, the take-up roller, a ratchet-wheel adapted to actuate said take-up roller, the lay, pawls connected with said lay and adapted to actuate said ratchet, a connection between said slide and one of said pawls, and means to move said slide back and forth, thereby moving said trough and yarn-carrier into and out of operative position and the last-named pawl into and out of engagement with said ratchet, substantially as described.

18. In a loom, in combination, a vertically-reciprocating selector, a slide, a hair-trough and a yarn-carrier carried by said slide, a nipper, the take-up roller, a ratchet-wheel adapted to actuate said take-up roller, the lay, a pivoted lever, a rod connecting said lay and lever, two pawls pivoted on said lever and adapted to engage said ratchet, a flexible connection between said slide and one of said pawls, and means to move said slide back and forth, thereby moving said trough and yarn-carrier into and out of operative position and the last-named pawl into and out of engagement with said ratchet, substantially as described.

19. In a loom, in combination, a yarn-carrier, a device adapted to grasp the yarn carried by said yarn-carrier and pull it across the loom, a fixed blade and a movable blade forming shears, a cam, a spring-pressed lever engaging said cam, a bell-crank, a link connecting said lever and one arm of said bell-crank, and a link connecting said movable blade and the other arm of said bell-crank, substantially as described.

20. In a loom, in combination, a yarn-carrier, a device adapted to grasp the yarn carried by said yarn-carrier and pull it across the loom, the take-up roller, mechanism to stop the advance of the take-up roller, a finger adapted when actuated to render said mechanism inoperative, and means to move said yarn-carrier during the insertion of the yarn across the loom, thereby causing the yarn so inserted to actuate said finger, substantially as described.

21. In a loom, in combination, a yarn-carrier, a device adapted to grasp the yarn carried by the yarn-carrier and pull it across the loom, a cutter adapted to sever the yarn, and means adapted to impart to the yarn-carrier a quick up-and-down movement after said yarn is so severed, substantially as described.

22. In a loom, in combination, a yarn-carrier, a device adapted to grasp the yarn carried by the yarn-carrier and pull it across the loom, a cutter adapted to sever the yarn, a vertically-movable rod to which said yarn-carrier is attached, a cam, a roller engaging said cam, a lever carrying said roller, and a connection between said lever and rod, whereby the rod is moved vertically, substantially as described.

23. In a loom, in combination, a yarn-carrier, a device adapted to grasp the yarn carried by said yarn-carrier and pull it across the loom, the take-up roller, mechanism to stop the advance of the take-up roller, a finger adapted when actuated by the thrown yarn to render said mechanism inoperative, a cutter adapted to sever the yarn, means adapted to impart to said yarn-carrier an initial downward movement during the throw of the yarn across the loom, and another downward movement after the yarn is severed by the cutter, substantially as described.

24. In a loom, in combination, a hair-trough, a selector having jaws adapted to grasp a strand of hair, means to open and close said jaws, means to move said selector toward and from said trough, a nipper adapted to grasp the hair picked by the selector, means to render said selector inoperative, and means to render said jaws inactive while the selector is inoperative, substantially as described.

25. In a loom, in combination, a hair-trough, a selector having jaws adapted to grasp a strand of hair, means to move said selector toward and from said trough, means to open and close said jaws, means to bring said selector and trough into and out of operative relation, and means to render said jaws inactive while said selector and trough are out of operative relation, substantially as described.

26. In a loom, in combination, a hair-trough, a selector having jaws, one fixed and one movable, adapted to grasp a strand of hair, means to move said selector toward and from said trough, a pivoted lever adapted to actuate the movable jaw of the selector, a cam adapted to actuate said lever, means to move said trough out of operative relation with said selector, and an arm on said trough adapted, when said trough is so moved, to hold said lever out of engagement with said cam, whereby said lever is held from actuating the movable jaw of the selector, substantially as described.

27. In a loom, in combination, a yarn-carrier, a hair-trough, a selector, a nipper adapted to grasp the yarn or hair and pull it across the loom, weft-control mechanism adapted to bring said hair-trough and selector and said yarn-carrier alternately into operative relations with said nipper, a cutter adapted to sever the yarn, pattern mechanism, and means actuated by the pattern mechanism to bring said weft-control mechanism into operation, substantially as described.

28. In a loom, in combination, a nipper, a hair-trough, a selector, a yarn-carrier, shifting mechanism to simultaneously bring said hair-trough and selector out of operative relation and said yarn-carrier and nipper into operative relation and vice versa, pattern mechanism, means controlled thereby to actuate said shifting mechanism, the take-up roller, a device for accelerating the speed of rotation of said take-up roller, means actuated by the shifting mechanism adapted to move said take-up-roller speed-accelerating device into operation, a cutter adjacent to the yarn-carrier for severing the yarn, and means to actuate said cutter, substantially as described.

29. In a loom, in combination, a nipper, a hair-trough, a selector having jaws adapted to grasp a strand of hair and present it to the nipper, a yarn-carrier, shifting mechanism to simultaneously bring said hair-trough and selector out of operative relation and said yarn-carrier and nipper into operative relation and vice versa, pattern mechanism, means controlled thereby to actuate said shifting mechanism, the take-up roller, a device for accelerating the speed of rotation of said take-up roller, means actuated by the shifting mechanism adapted to move said take-up-roller speed-accelerating device into operation, a cutter adjacent to the yarn-carrier for severing the yarn, means to actuate said cutter, and means to render said jaws inactive while said selector and trough are out of operative relation, substantially as described.

30. In a loom, in combination, a nipper adapted to grasp an end of weft and pull it across the loom, a source of yarn-supply, a hair-trough, and a selector adapted to pick a strand of hair from said trough and present it to the nipper.

31. In a loom, in combination, a source of yarn-weft supply, a hair-trough, a selector adapted to select strands of hair from said trough, and mechanism adapted to travel across the loom and insert a pick or picks of weft.

32. In a loom, in combination, a pick-inserting device adapted to grasp a pick of weft and pull it across the loom, a source of yarn-supply, a source of hair-supply, a selector adapted to select a strand of hair and present it to the pick-inserting device, and a yarn-carrier adapted to present an end of yarn to the pick-inserting device, substantially as described.

33. In a loom, in combination, a pick-inserting device adapted to grasp a pick of weft and pull it across the loom, a source of yarn-supply, a source of hair-supply, a selector adapted to select a strand of hair and present it to the pick-inserting device, a yarn-carrier adapted to present an end of yarn to the pick-inserting device, and a cutter adapted to sever the yarn after its insertion by the pick-inserting device, substantially as described.

34. In a loom, in combination, a pick-inserting device adapted to grasp a pick of weft and pull it across the loom, a source of yarn-supply, a source of hair-supply, a selector adapted to select a strand of hair and persent it to the pick-inserting device, a yarn-carrier adapted to present an end of yarn to the pick-inserting device, a cutter adapted to sever the yarn after its insertion by the pick-throwing device, and means to move the selector and the yarn-carrier into and out of operative relation with the nipper, substantially as described.

35. In a loom, in combination, a hair-trough, a selector, a source of yarn-supply, a cutter, a pick-inserting device, means to actuate said selector to cause it to select a strand of hair from said trough and present it to the pick-throwing device, and means to actuate the cutter thereby severing the yarn.

36. In a loom, in combination, a hair-trough, a vertically-reciprocating selector, and means to move said trough into and out of operative relation with the selector, substantially as described.

37. In a loom, in combination, a slide, a hair-trough mounted thereon, a selector, and means to move the slide alternately back and forth a distance sufficient to carry said trough into and out of operative relation with the selector, substantially as described.

In testimony of which invention I have hereunto set my hand, at Philadelphia, on this 30th day of December, 1903.

GEORGE S. COX.

Witnesses:
WILLIAM B. MARKS,
M. M. HAMILTON.